United States Patent

[11] 3,627,753

| [72] | Inventors | Theodore Posternak<br>Geneva, Switzerland;<br>Georges (Dorde) Cehovic, Villejuif, France;<br>Ilan Marcus, Geneva, Switzerland;<br>Sathyavathy Vengadabady, Vitry-sur-Seine, France |
|---|---|---|
| [21] | Appl. No. | 881,857 |
| [22] | Filed | Dec. 3, 1969 |
| [45] | Patented | Dec. 14, 1971 |
| [73] | Assignee | Agence Nationale de Valorisation de la Recherche<br>Hauts de Seine, France |

[54] ISO-ADENOSINE-3',5'-MONOPHOSPHORIC ACID AND ITS SALTS
4 Claims, No Drawings

[52] U.S. Cl.................................................260/211.5 R, 260/999
[51] Int. Cl....................................................C07d 51/54
[50] Field of Search........................................260/211.5, 211.5 R

[56] References Cited
UNITED STATES PATENTS
3,457,253 7/1969 Wechter.................. 260/211.5
3,462,414 8/1969 Wechter.................. 260/211.5

Primary Examiner—Lewis Gotts
Assistant Examiner—Johnnie R. Brown
Attorney—Stevens, Davis, Miller & Mosher

ABSTRACT: The compound iso-adenosine-3',5'-monophosphoric acid is provided which has the formula

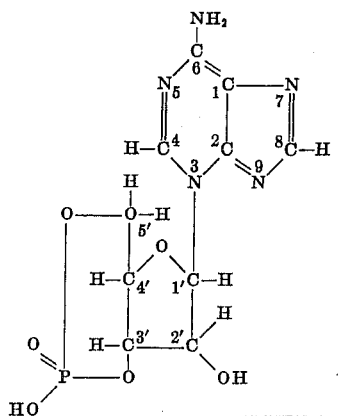

ISO-ADENOSINE-3',5'-MONOPHOSPHORIC ACID AND ITS SALTS

This invention relates to new chemical compounds of therapeutic utility.

According to the present invention there is provided iso-adenosine 3', 5'-monophosphoric acid (herein referred to for brevity as "cyclic iso-AMP") corresponding to the formula

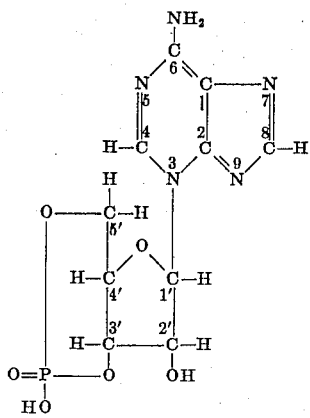

and its salts.

Similarly to adenosine 3', 5'-monophosphoric acid (cyclic AMP), known to act as second intracellular messenger with respect to a large number of hormones, cyclic iso-AMP generates the dispersion of melanophores in the skin of the frog in vitro and the dilatation of melanophores in the skin of the lizard in vitro, and it increases the liberation of the hormone thyretorope (TSH) by hypophysis in rats in vitro, but, in all these tests, it shows itself clearly superior to the base nucleotide (cyclic AMP) which is surprising.

According to a further feature of the invention, the compound cyclic iso-AMP is prepared by transforming (non-cyclic) iso-AMP into a p-nitrophenolic ester form, by the action of p-nitrophenol in the presence of dicyclohexyl carbodiimide, and then treating this ester with potassium (tert) butoxide.

The following example illustrates the production of cyclic iso-AMP.

PREPARATION OF ISO-ADENOSINE-3', 5'-PHOSPHORIC AND (CYCLIC ISO-AMP) AND ITS SALTS

The iso-adenosine-5'-phosphoric acid (iso-AMP) was prepared according to the method of Leonard & Laursen (Biochemistry 4, 354 (1965)).

Fifty mg. of iso-AMP in the form of the free acid, carefully dried, were dissolved in a mixture of 2 ml. pyridine, and 2 ml. dimethyl formamide. There were added 0.104 ml. tri-n-butylamine, 557 mg. p-nitrophenol and 824 mg. of dicyclohexyl carbodiimide. The mixture was stirred in the dark for 48 hours. The nucleotide then passed into solution. By paper chromatography (ethanol/ammonium acetate 0.5 M; 5:2 by volume), three substances were detected: the p-nitrophenolic ester of iso-AMP, the corresponding symmetrical pyrophosphate and the excess p-nitrophenol. The solution was then evaporated to dryness and the residue taken up in 10 ml. water. After filtration, extraction 5 times was dried out, each time with 10 ml. ether, to remove the p-nitrophenol and the excess dicyclohexy carbodiimide. The aqueous solution was poured into a column (40 cm. long and 2.8 cm. diameter) of DEAE cellulose in the form of its bicarbonate. The column was washed with 500 ml. of double-distilled water and elution by concentration gradient was carried out by means of water gradually dosed with 0.1 M triethylammonium bicarbonate (pH 7.5) (used to a total of 3 liters of mixture). Fractions of 20 ml. were collected. As indicated by paper chromatography, the p-nitrophenolic ester of iso-AMP is contained in fractions 45-80. These fractions, remixed together, were evaporated to dryness and coevaporated several times with methanol to eliminate triethylamine. Yield 76-80 percent of the total phosphorus dosage.

$\lambda$ max 256 m$\mu$; $\epsilon$ max 19,600.

The solution is evaporated to dryness. The residue which is the triethylammonium salt of the ester is dried over $P_2O_5$ under high vacuum: 186 mg. obtained. This was dissolved in 20 ml. anhydrous dimethyl sulfoxide and 2 ml. of a 1 solution of potassium t-butoxide in anhydrous t-butanol were added, which generated the formation of cyclic iso-AMP with the liberation of P-nitrophenate. At the end of 3 hours at normal temperature, 10 times the theoretical quantity of DOWEX 50 ($NH_4^+$ form) dried under vacuum at 65° were added. The mixture was shaken and filtered. The resin was washed with 0.2 M ammonia until complete elution of the cyclic nucleotide. The ammonia was driven off by evaporation under vacuum and fractionation carried out as indicated above in a column of DEAE cellulose. Tubes 70-100 contained the cyclic nucleotide: their contents were evaporated to dryness under vacuum. The residue was taken up in 0.5 ml. methanol and 2.5 ml. of a 0.5 M solution of sodium perchlorate in acetone added; the precipitation is completed by addition of 5 ml. anhydrous acetone. The sodium salt is recovered by centrifuging and washed with anhydrous acetone. Yield based on the phosphorus dosage and on UV absorption 56 percent;

$\lambda$ max 278 m$\mu$; $\epsilon$ max 14,800 (in aqueous solution at pH 70).).

The product is purified again by precipitation from concentrated aqueous solution by means of silver nitrate in slight excess. The precipitate is washed with 50 percent ethanol. The elementary analysis of the silver salt gave the correct results. By decomposition, in aqueous solution, by means of hydrogen sulfide there is obtained a solution of cyclic iso-AMP in the form of the free acid. This latter is amorphous. By neutralization by means of a mineral or organic base, the corresponding salts are obtained.

The iso-adenosine-3', 5'-monophosphoric acid and its salts are useful for biochemical and pharmaceutical research.

What we claim is:

1. The compound iso-adenosine-3', 5'-monophosphoric acid

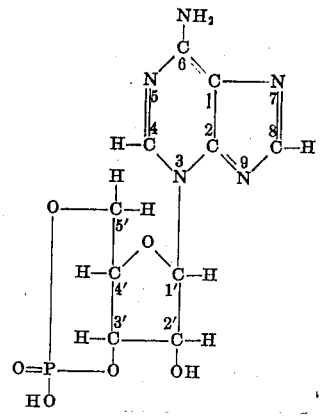

and its sodium and silver salts.

2. A method for the production of iso-adenosine-3', 5' monophosphoric acid of the formula

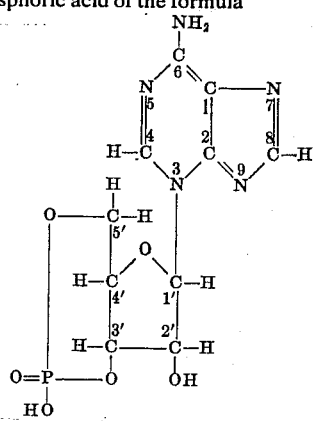

which comprises reacting adenosine 3′, 5′-monophosphoric acid with p-nitrophenol in the presence of dicyclohexyl carbodiimide and reacting the product with potassium tert butoxide.

3. A sodium salt of the compound of claim 1.
4. A silver salt of the compound of claim 1.

* * * * *